Patented June 10, 1952

2,599,532

UNITED STATES PATENT OFFICE 2,599,532

PREPARATION OF PECTINASE-FREE DIASTASE

Carl V. Smythe, Moorestown, N. J., and Clifford E. Neubeck, Philadelphia, Pa., assignors to Rohm & Haas Company, Philadelphia, Pa., a corporation of Delaware No Drawing. Application November 14, 1949, Serial No. 127,242

3 Claims. (Cl. 195—66)

This invention relates to diastase which is substantially free from enzymes that act on pectin, herein generically termed pectinases, and to a method of the preparation of such diastase.

A common procedure for preparing diastatic enzymes is based upon the growing of mold fungi upon nutrient media. Fungi from the genera Aspergillus, Penicillium, and Rhizopus are known to be effective and by the cultivation of selected strains high yields of amylolytic enzymes can be obtained. The diastases thus produced, however, carry with them enzyme systems which act on other substrates than starch. Among these are enzymes which act upon pectin.

When diastase is used to digest starch in the presence of pectin and it is desirable to avoid digestion of the pectin, the diastase should be free of all pectinases. There has arisen, therefore, a need for diastase free from enzymes which attack pectin.

We have found that such a pectinase-free diastase can be prepared by treating an aqueous solution containing diastase and enzymes acting on pectin with urea and allowing the resulting solution to stand at 0° to 50° C. until the ferments which act on pectin are no longer active. Diastase may then be isolated from the solutions.

The method here-described is effective for treating any preparation of diastase which contains enzymes acting on pectin. Among the latter are polygalacturonase which converts pectin to other products and pectinesterase which demethylates pectin to low-methoxyl pectin and pectic acid. The diastase is preferably of fungal origin, but it need not be from this source. By the preferred procedure a selected strain of *Aspergillus flavus, Aspergillus orzyzae, Penicillium glaucum, Rhizopus tritici*, or the like, is grown on nutrient media. Suitable media include crushed cereal grains and mixtures thereof. Wheat bran, middlings, rice hulls, soya bean meal, and the like may be used. The nutrient medium may be adjusted as to pH. Inorganic elements may be supplied such as calcium, magnesium, potassium, phosphate, and the like. The usual methods for growing fungi on moist media are then followed. Steps include preparation of a medium, sterilization, inoculation with a suspension of spores, growth of the organism on the medium, drying or other step to stop growth, and extraction of the medium. The extract itself may be taken and treated with urea. Alternatively, the enzymes present in the extract may be precipitated, as by addition of a water-miscible, volatile, organic solvent such as ethyl alcohol, isopropanol, or acetone. The precipitated product may be dried, if desired, particularly when it is to be stored. To rid it of enzymes acting on pectin, the precipitate is taken up in water and treated with urea or thiourea.

The urea is used as relatively high concentrations. The preferred concentrations are 6 to 6.6 molar of urea, corresponding to about 500 grams of urea (up to saturation) per liter of enzyme solution. Thiourea is used at approximate saturation.

Solutions containing urea or thiourea and enzymes are allowed to stand until the enzymatic action on pectin has substantially disappeared. Suitable temperatures for storing the solution are between 0° and 50° C. with times varying from about 120 hours to about one hour, time and temperature being in inverse relationship. The pH of the solution is desirably in the range of 6 to 8 but may be varied outside of this range, particularly in the case of diastatic enzymes which have stabilities at more acidic or more alkaline levels of pH.

The solution used may conveniently contain 5% to 40% of precipitable enzyme products. After addition of urea and storage the diastatic enzymes are recoverable from the aqueous solutions through precipitation resulting by addition of a water-miscible, volatile, organic solvent, such as methanol, ethanol, isopropanol, or acetone. There may be also added to the solution soluble inorganic salts, such as ammonium chloride, sodium chloride, calcium chloride, sodium sulfate, sodium phosphate, ammonium acid phosphate and the like to improve the form or nature of the precipitated enzymes. Precipitation is best accomplished with cold solution and cold solvent, a range of 5° to 20° C. for this operation being preferred. The amount of solvent added may be varied from three to ten volumes of solvent per volume of solution. The precipitate may be separated by decanting and filtering or by centrifuging. The separated precipitate can be dried at temperatures up to about 50° C. without loss of activity.

The process of treating diastases carrying enzymes which act on pectin to yield diastases substantially free of the latter is illustrated by the following specific examples.

*Example 1*

A nutrient medium was prepared by mixing 1800 parts by weight of wheat bran, 1400 parts of wheat middlings, 150 parts of lactic acid, and 500 parts of water. The mixture was heated in an autoclave to sterilize it and then inoculated with a suspension of the spores of a strain of

*Aspergillus flavus-oryzae* selected because of its capacity to produce diastase in good yield. The suspension amounted to 5000 parts by weight. The inoculated medium was incubated at 35° C. for 48 hours and then dried at 50°–60° C. The dried product was extracted with water, yielding 3200 parts of a 16° Brix extract which contained 91% of the diastatically active substances in the dried medium.

To the extract were added 1600 parts of crystalline urea and then 40 parts of concentrated ammonia water. The pH of the solution was then 8. It was stored at 8° C. for 60 hours, within which time the enzymes acting on pectin had been inactivated. A slight precipitate, present at this point, was separated. The clear liquid was then treated with glacial acetic acid, 27 parts being required to give a pH of 5.9. Five volumes of ethyl alcohol, cooled to 15° C., were then added per volume of treated solution. A precipitate resulted and was allowed to settle. The supernatant liquor was drawn off and the precipitate was washed twice with three volumes of cold alcohol. The precipitate was separated by centrifuging and dried at 40° C.

The product had a high diastatic activity and had no noticeable effect on a pectin solution.

*Example 2*

Eighty gallons of an extract which was obtained from a culture of *Aspergillus oryzae* on moist bran and middlings and which had a density of 16.5° Brix was treated with 250 pounds of urea and stirred for an hour to dissolve the urea. The pH of the solution was then 5.95. The pH was brought to 7.7 by the addition of eleven pounds of 26° Baumé ammonia. The volume was now 110 gallons. The temperature of the solution was then adjusted to 12° C. and maintained at this temperature for 80 hours. The pH was then lowered to a value of 6 by addition of 4.5 lbs. of acetic acid and 1.5 lbs. of calcium chloride. The treated solution was then mixed with 500 gallons of ethyl alcohol which had been cooled to 15° C. The mixture was thoroughly stirred and allowed to stand. In about two hours the precipitate had settled into the lower half of the mixture. The clear liquor was drawn off. About 200 gallons of alcohol was stirred into the remaining liquid and the mixture again allowed to stand. After an hour the clear supernatant liquor was again drawn off and the precipitate was resuspended in about 200 gallons of alcohol and again allowed to settle. After clear liquid had been removed, the precipitate was isolated by centrifuging. It amounted to 23 pounds when dry. The product was rich in diastase but had no activity towards pectin.

*Example 3*

The procedure of Example 2 was followed except the urea-enzyme solution was stored for 96 hours. There were obtained from the treated solution 24 pounds of diastase free from pectinase.

*Example 4*

There were taken 150 parts by weight of the precipitate obtained through addition of ethyl alcohol and acetone to the extract from bran on which a selected strain of *Rhizopus nigricans* had been grown. The precipitated enzymes were dissolved in a solution from 181 parts of urea and 362 parts of water. The solution was adjusted by addition of ammonia to a pH of 7.5. It was then stored at 9° C. for 88 hours. Since some sludge was present at this point, the solution was passed through a centrifuge and a clear portion of 543 parts was obtained. One hundred parts of ammonium dihydrogen phosphate were added to the solution. The pH of the solution was then 5.8. Two thousand parts of ethyl alcohol were then run into the solution and the resulting mixture well stirred. It was then allowed to settle and the precipitate was washed twice with cold alcohol. The solid was finally separated on a filter in a yield of 133 parts (dry). The product was highly effective in liquefying starch but was free of enzymes acting on pectin.

*Example 5*

A solution of 100 parts by weight of precipitated enzymes from the extract of the culture of *Aspergillus oryzae* on moist bran and middlings was prepared in 250 parts of water. The pH of the solution was adjusted to 7.7 with ammonia and thiourea was added until the solution was approximately saturated therewith. A portion of the solution was cooled to 8° C. and held at this temperature for 162 hours. Analysis at that time showed that 98.5% of the pectinase activity had been destroyed, while 86% of the original diastatic activity remained.

Another portion of the solution was held at 25° C. for 100 hours. Over 99% of the pectinase had then been destroyed with but slight decrease in diastatic activity.

The diastase which is produced by the method of this invention is distinguished from other diastases by being substantially free of pectinases and by being active at a pH of 3.5 or less. Thus, by tests for these characteristics one can distinguish the diastase resulting from the process of this invention from other fungal diastases and from diastases of other origins.

We claim:

1. A process for preparing diastase free from enzymes acting on pectin which comprises forming a solution of (1) a member of the class consisting of thiourea and urea and (2) diastatic enzymes accompanied by enzymes acting on pectin, said solution having a pH at which said diastatic enzymes are stable and being relatively concentrated with respect to said member, storing the solution at a temperature between 0° and 50° C. until the activity of the enzymes acting on pectin has essentially disappeared, and separating diastase from the stored solution.

2. A process for preparing diastase free from enzymes acting on pectin which comprises preparing with a pH of 6 to 8 an aqueous solution of enzymes which act both on starch and on pectin and of urea at a concentration of 6 to 6.6 molar, allowing the solution to stand at 0° C. to 50° C. for 120 hours to one hour, and separating diastase from the stored solution.

3. The process of claim 2 in which enzymes which are stored in solution are of fungal origin.

CARL V. SMYTHE.
CLIFFORD E. NEUBECK.

REFERENCES CITED

The following references are of record in the file of this patent:

UNITED STATES PATENTS

| Number | Name | Date |
|---|---|---|
| 1,892,247 | Neugebauer | Dec. 27, 1932 |
| 2,163,200 | Heimann | June 20, 1939 |
| 2,434,874 | Tucker | Jan. 20, 1948 |
| 2,457,560 | Jansen | Dec. 28, 1948 |
| 2,458,171 | Jansen | Jan. 4, 1949 |
| 2,479,751 | Lineweaver | Aug. 23, 1949 |